United States Patent
Greib et al.

(10) Patent No.: US 6,168,206 B1
(45) Date of Patent: *Jan. 2, 2001

(54) ASSEMBLY FOR PROTECTING A VEHICLE OCCUPANT'S HEAD FROM AN IMPACT

(75) Inventors: Gary R. Greib, Lake Orion; Henry G. Eberwein, Washington, both of MI (US)

(73) Assignee: TRW Vehicle Safety Systems Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/034,025

(22) Filed: Mar. 2, 1998

(51) Int. Cl.[7] .......................... B60R 22/28; B60R 21/055
(52) U.S. Cl. ...................... 280/808; 280/805; 280/801.1; 280/751; 297/471
(58) Field of Search ................................ 280/801.1, 808, 280/805, 751; 297/470, 471, 468, 483, 486, 472

(56) References Cited

U.S. PATENT DOCUMENTS

| | | | |
|---|---|---|---|
| 4,955,639 | * 9/1990 | Yamamoto | 280/808 |
| 5,529,344 | 6/1996 | Yasui et al. | |
| 5,601,311 | * 2/1997 | Pfeiffer et al. | 280/808 |
| 5,685,566 | 11/1997 | Hirase et al. | |
| 5,762,371 | * 6/1998 | Noguchi | 280/801.2 |
| 5,779,270 | * 7/1998 | Tanaka | 280/808 |
| 5,820,164 | 10/1998 | Patel et al. | |
| 5,826,907 | 10/1998 | Saito et al. | |
| 5,842,719 | * 12/1998 | Tanaka | 280/805 |
| 5,941,567 | * 8/1999 | Wickenheiser | 280/808 |
| 6,007,100 | * 12/1999 | Steffens, Jr. | 280/808 |

* cited by examiner

*Primary Examiner*—Lanna Mai
*Assistant Examiner*—Jeffrey Restifo
(74) *Attorney, Agent, or Firm*—Tarolli, Sundheim, Covell, Tummino & Szabo, L.L.P.

(57) ABSTRACT

An assembly (10) for use in a vehicle comprises a webbing guide (30) for guiding movement of seat belt webbing (14) in the vehicle and a fastener (70) for mounting the webbing guide (30) in position in the vehicle. The fastener (70) has a head portion (76). The assembly (10) further has a resilient cover member (80) that includes a cover portion (82) covering the head portion (76) of the fastener (70) and at least a portion (32) of the webbing guide (30). The resilient cover member (80) further includes a first rib portion (100) projecting from the cover portion (82) toward the head portion (76) of the fastener (70) and a second rib portion (110) projecting from the cover portion (82) toward the webbing guide (30). The first and second rib portions (100, 110) are resiliently crushable to absorb energy in response to an impact of a vehicle occupant's head against the cover portion (82).

18 Claims, 3 Drawing Sheets

ASSEMBLY FOR PROTECTING A VEHICLE OCCUPANT'S HEAD FROM AN IMPACT

BACKGROUND OF THE INVENTION

1. Technical Field

The present invention relates to an assembly for use in a vehicle and which comprises a webbing guide for guiding movement of a seat belt webbing, a fastener for mounting the webbing guide, and a cover member for covering the webbing guide and the fastener. The assembly helps to protect a vehicle occupant's head from a forcible impact against the assembly.

2. Description of the Prior Art

A typical vehicle seat belt system includes a length of belt webbing which is extensible about a vehicle occupant in a vehicle seat to restrain the occupant. Intermediate its ends, the belt webbing passes through a webbing guide, sometimes referred to as a D-ring, which is part of a webbing guide assembly mounted in the vehicle adjacent the vehicle seat. In the event of a collision, particularly a side impact collision, the head of the occupant can forcibly strike the webbing guide assembly.

The United States Department of Transportation Federal Motor Vehicle Safety Standard No. 201 (1996 requires such a webbing guide assembly, which includes the webbing guide and an associated fastener, to have a Head Impact Criterion (referred to as HIC(d)) value of under 1000 determined in accordance with the Standard No. 201.

SUMMARY OF THE INVENTION

The present invention is an assembly for use in a vehicle. The assembly comprises a webbing guide for guiding movement of seat belt webbing in the vehicle and a fastener for mounting the webbing guide in position in the vehicle. The fastener has a head portion. The assembly further comprises a resilient cover that includes a cover portion covering the head portion of the fastener and at least a portion of the webbing guide. The resilient cover further includes a first rib portion projecting from the cover portion toward the head portion of the fastener and a second rib portion projecting from the cover portion toward the webbing guide. The first and second rib portions are resiliently crushable to absorb energy in response to an impact of a vehicle occupant's head against the cover portion. The resilient cover provides the assembly with an HIC(d) of under 1000 determined in accordance with the United States Department of Transportation Federal Motor Vehicle Safety Standard No. 201 1996.

BRIEF DESCRIPTION OF THE DRAWINGS

Further features of the present invention will become apparent to one skilled in the art to which the present invention relates from reading the following specification with reference to the accompanying drawings, in which.

DESCRIPTION OF A PREFERRED EMBODIMENT

Figure 1:
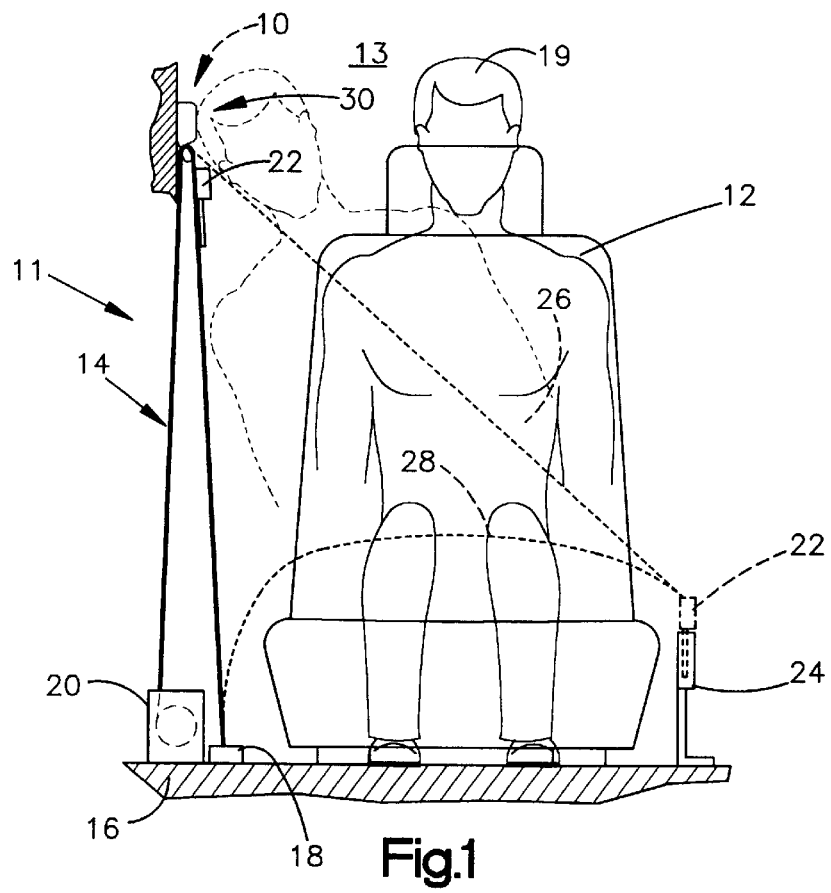
FIG. 1 is a schematic illustration of a vehicle seat belt system including an assembly for protecting a vehicle occupant's head in accordance with the present invention.

The present invention relates to an assembly for helping to protect the head of an occupant of a vehicle from a forcible impact against a seat belt webbing guide which is mounted in a passenger compartment of the vehicle. The present invention is applicable to various seat belt system configurations. As representative of the present invention, FIG. 1 illustrates an assembly 10 for helping to protect a vehicle occupant's head 19 from a forcible impact. The assembly 10 is incorporated in a three-point continuous loop seat belt system 11 for use in restraining the occupant in the vehicle.

During operation of the vehicle, the occupant of the vehicle sits on a seat 12 in a passenger compartment 13 of the vehicle. A length of seat belt webbing 14 is extensible about the vehicle occupant. One end of the length of belt webbing 14 is anchored to the vehicle body 16 at an anchor point 18 located on one side of the seat 12. The opposite end of the belt webbing 14 is attached to a seat belt webbing retractor 20 which is secured to the vehicle body 16 on the same side of the seat 12. Intermediate its ends, the belt webbing 14 passes through a tongue assembly 22 and a webbing guide 30 that is located above the retractor 20 and the anchor point 18. When the seat belt system 11 is not in use, the belt webbing 14 is wound on the retractor 20 and is oriented generally vertically on the one side of the seat 12, as shown in solid lines in FIG. 1.

To engage the seat belt system 11, the tongue assembly 22 is manually grasped and is pulled across the lap and torso of the occupant sitting in the seat 12. As the tongue assembly 22 is pulled across the lap and torso of the occupant, the tongue assembly 22 moves along the belt webbing 14, and the belt webbing 14 is unwound from the retractor 20. When the belt webbing 14 has been pulled across the lap and torso of the occupant, the tongue assembly 22 is connected with a buckle 24, as shown in dashed lines in FIG. 1. The buckle 24 is connected to the vehicle body 16 and is disposed on the side of the seat 12 opposite the anchor point 18. When the seat belt system 11 is thus buckled, the length of belt webbing 14 is divided by the tongue assembly 22 into a torso portion 26 which extends across the torso of the occupant and a lap portion 28 which extends across the lap of the occupant.

Figure 2:
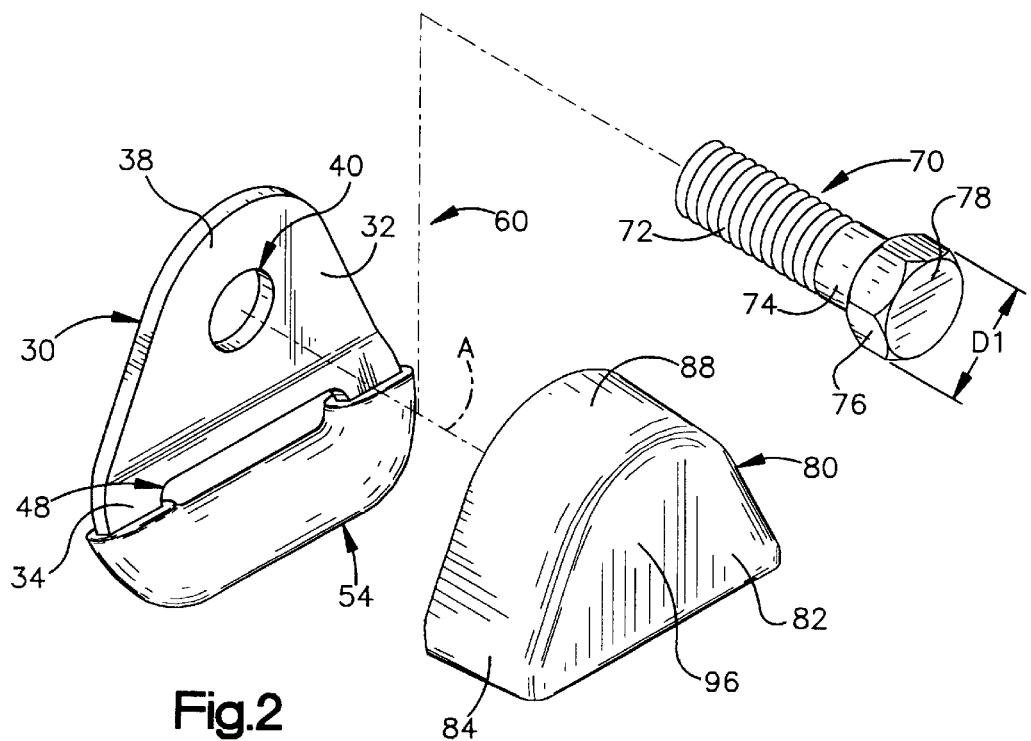
FIG. 2 is an exploded perspective view of parts of the vehicle seat belt system shown in FIG. 1.

The webbing guide 30 (FIG. 2) is preferably made from metal and is substantially triangular in shape. The webbing guide 30 shown in FIG. 2 is one of the many different types of webbing guides which are known in the art. The webbing guide 30 includes a planar body section 32 and a guide section 34 which extends from the body section 32 at an angle Φ (FIG. 3) relative to the body section. The body section 32 has parallel first and second side surfaces 36 and 38. A clearance hole 40 is located in the body section 32 of the webbing guide 30 and is centered on an axis A as shown in FIG. 2.

The guide section 34 of the webbing guide 30 has parallel first and second side surfaces 42 and 44 (FIG. 3) which merge with the first and second side surfaces 36 and 38, respectively, of the body section 32. The guide section 34 has a lower edge surface 46 which comprises the base of the triangular-shaped webbing guide 30. An elongate slot 48 (FIGS. 2 and 3) extends through the guide section 34. The elongate slot 48 is defined by an upper slot surface 50 and a lower slot surface 52 of the body section 32.

The webbing guide 30 further includes a webbing engagement cap 54. The webbing engagement cap 54 is preferably made from a plastic material with a low coefficient of friction and is bonded to the guide section 34 of the webbing guide 30 in a manner known in the art, such as by insert molding. The webbing engagement cap 54 covers port ion s of both the first and second surfaces 42 and 44 of the guide section 34, the lower surface 52 of the elongated slot 48, and the lower edge surface 46 of the guide section 34.

A mounting bolt 70 for mounting the webbing guide 30 has a threaded portion 72, a shank portion 74, and a head 76. The mounting bolt 70 is centered on the axis A. The dimensions of the threaded portion 72 and the shank portion 74 are selected so that the threaded portion and the shank portion extend freely through the clearance hole 40 in the body section 32 of the webbing guide 30. The head 76 of the mounting bolt 70 has a minimum diameter D1 (FIG. 2) which is greater than the diameter of the clearance hole 40 in the webbing guide 30. The head 76 of the mounting bolt 70 includes an end surface 78.

The assembly 10 further includes a resilient cover member 80. The cover member 80 (FIG. 2) is substantially triangular in shape and is approximately the same size as the body section 32 of the webbing guide 30. The cover member 80 is one piece and made of a homogeneous plastic material. Preferably, the cover member is made of polypropylene.

Figure 3:
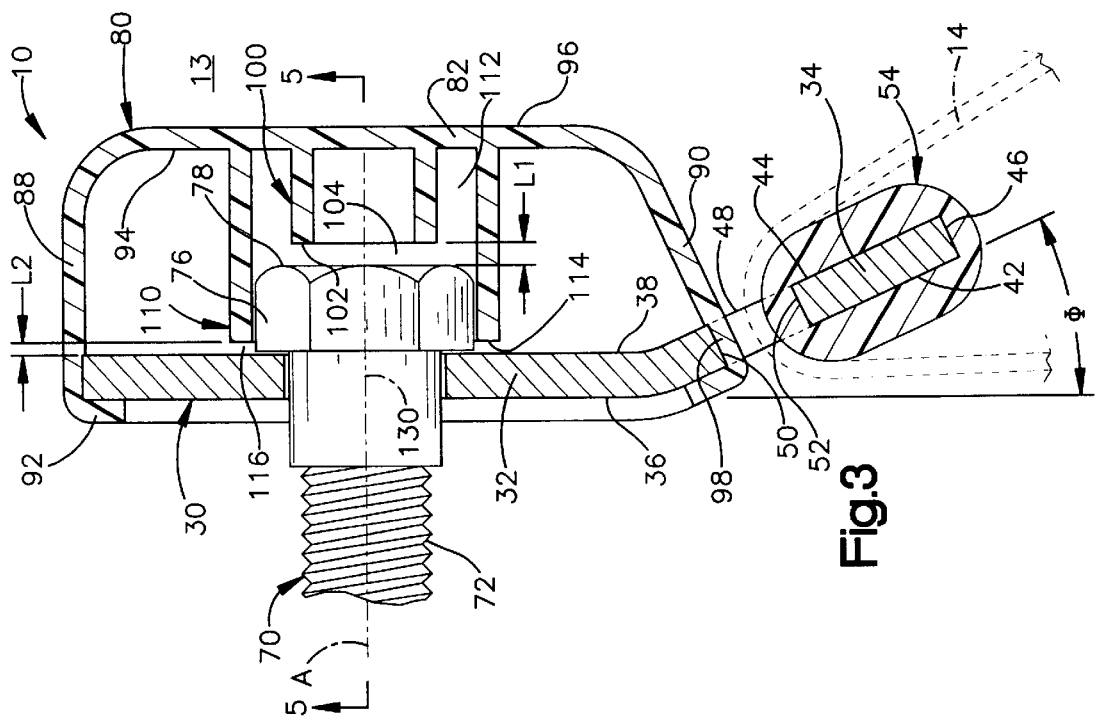
FIG. 3 is a sectional view of a portion of the apparatus shown in FIG. 1.

The cover member 80 includes a face portion 82 (FIG. 2), first and second lateral side wall portions 84 and 86 (FIG. 5), upper and lower side wall portions 88 and 90 (FIG. 3), and a peripheral lip 92 (FIG. 3). The face portion 82 has an inner surface 94 and an outer surface 96 which faces the passenger compartment 13. The first and second lateral side wall portions 84 and 86 and the upper and lower side wall portions 88 and 90 together form a side wall which extends between the face portion 82 of the cover member 80 and the peripheral lip 92 except at locations corresponding to portions of the webbing guide 30 laterally adjacent the slot 48. A portion 98 of the lower side wall portion 90 extends through the slot 48 in the guide section 34.

The peripheral lip 92 of the cover member 80 extends radially inward from the first and second lateral side wall portions 84 and 86 and the upper and lower side wall portions 88 and 90. The peripheral lip 92 extends over peripheral edges of the webbing guide 30 and engages the first surfaces 36 and 42 of the body section 32 and the guide section 34, respectively, of the webbing guide. The peripheral lip 92 provides the cover member 80 with a snap-fit connection to the webbing guide 30.

The cover member 80 has first and second resiliently crushable rib portions 100 and 110, respectively, which extend from the face portion 82 of the cover member. The first and second rib portions 100 and 110 are formed in one piece with the face portion 82 of the cover member 80. The first rib portion 100 extends from the inner surface 94 of the face portion 82 toward the head of the bolt. The first rib portion 100 is annular in shape and is centered on the axis A. In accordance with the preferred embodiment of the invention, the first rib portion 100 has an inside diameter D2 (FIG. 5) of approximately twelve millimeters and has a radial thickness R1 of approximately one millimeter. The first rib portion 100 includes an end surface 102 (FIG. 3) which, in the assembled condition of the assembly, is spaced from the end surface 78 of the bolt head 76 by a first distance L1 to define a first axial gap 104.

Figure 5:
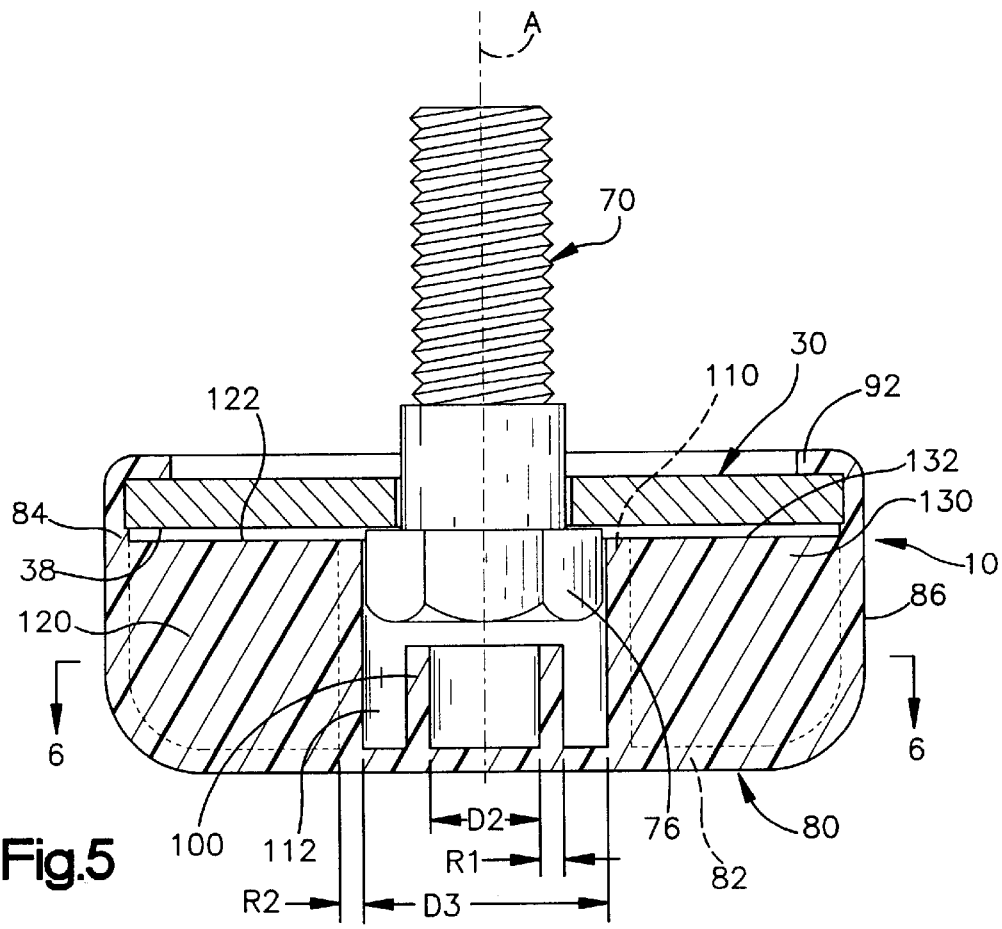
FIG. 5 is a sectional view taken along line 5—5 in FIG. 3.

The second rib portion 110 extends from the inner surface 94 of the face portion 82 toward the second side surface 38 of the webbing guide 30. The second rib portion 110 is annular in shape and is centered on the axis A. The second rib portion 110 surrounds and is concentric with the first rib portion 100. In accordance with the preferred embodiment of the invention, the second rib portion 110 has an inside diameter D3 of approximately twenty four millimeters and has a radial thickness R2 of approximately one millimeter (FIG. 5). Thus, there is an annular space 112 which extends a radial distance of approximately five millimeters between the first and second rib portions 100 and 110, respectively.

The second rib portion 110 includes an end surface 114 (FIG. 3) which, in the assembled condition of the assembly, is spaced from the second side surface 38 of the webbing guide 30 by a second distance L2 to define a second gap 116. The second distance L2 between the second rib portion 110 and the webbing guide 30 is less than the first distance L1 between the first rib portion 100 and the bolt head 76.

Figure 6:
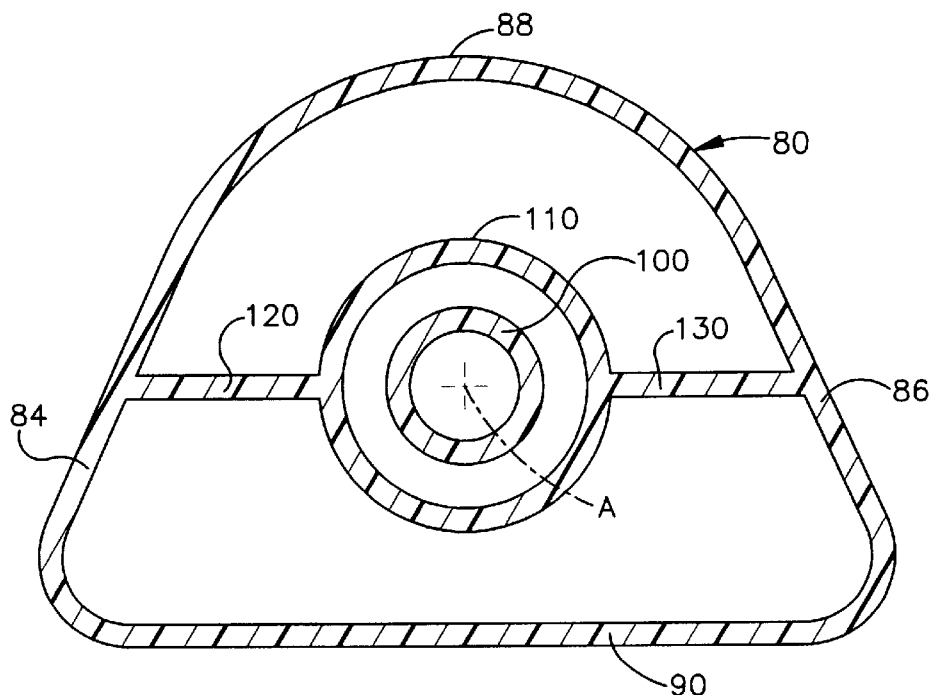
FIG. 6 is a sectional view taken along line 6—6 in FIG. 5.

The cover member 80 further includes first and second resiliently crushable rib extensions 120 and 130, respectively, which extend from the second rib portion 110 (FIGS. 5 and 6). The first and second rib extensions 120 and 130 are formed in one piece with the second rib portion 110 of the cover member 80. The first and second rib extensions 120 and 130 are co-linear and extend radially from the second rib portion 110 at diametrically opposed locations. The rib extensions 120 and 130 are preferably approximately one millimeter thick.

The first rib extension 120 extends from the second rib portion 110 to the first lateral side wall portion 84 of the cover member 80. The first rib extension 120 has an end surface 122 which lies in the same plane as the end surface 114 of the second rib portion 110. Thus, the first rib extension 120 is spaced from the webbing guide 30 by the second distance L2 and the second axial gap 116.

The second rib extension 130 of the cover member 80 extends from the second rib portion 110 to the second lateral side wall portion 86 of the cover member 80. The second rib extension 130 has an end surface 132 which lies in the same plane as the end surface 114 of the second rib portion 110. Thus, the second rib extension 130 is also spaced from the webbing guide 30 by the second distance L2 and the second axial gap 116.

In the event of a vehicle collision, particularly a side impact collision, the occupant of the seat 12 typically moves in the passenger compartment 13. The movement of the occupant can result in a portion of the occupant, such as the occupant's head 19, striking the resilient cover member 80. When the cover member 80 is struck, the cover member 80 deflects inward and one or more of the rib portions 100, 110 and the rib extensions 120, 130 are resiliently crushed to absorb the energy of the impact, as illustrated in FIG. 4.

Figure 4:
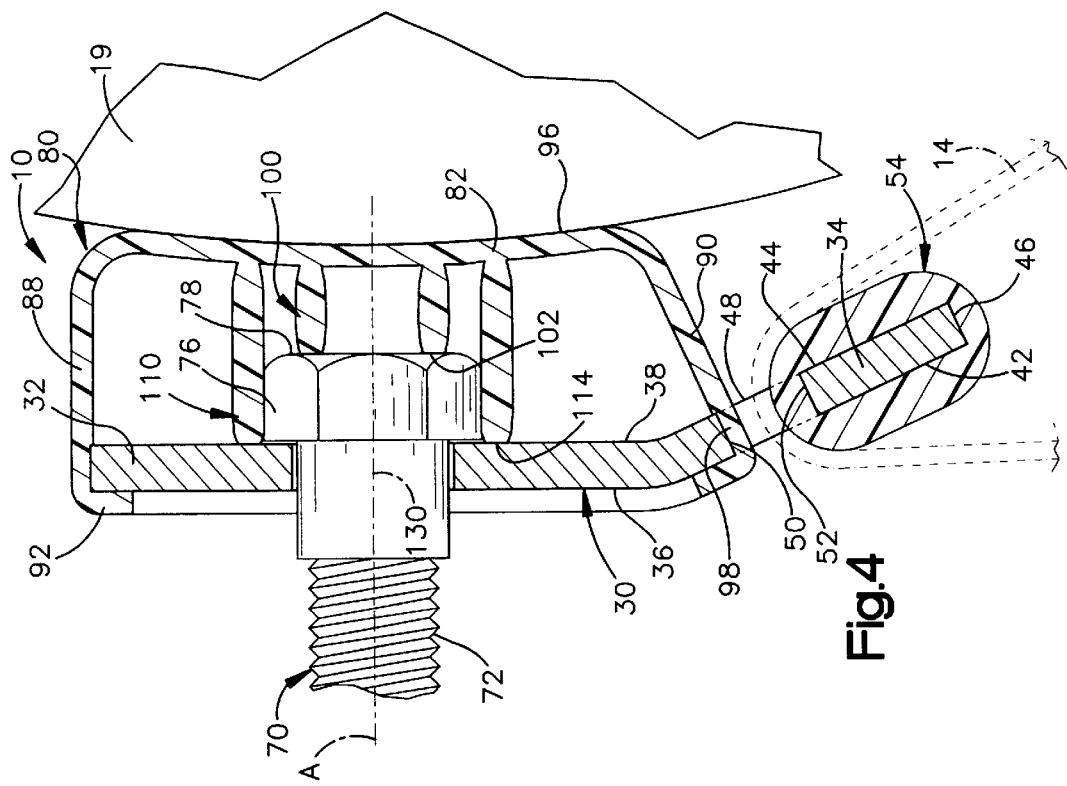
FIG. 4 is view similar to FIG. 3 showing parts in different positions.

If the cover member 80 is struck generally along the axis A as shown in FIG. 4, the face portion 82 of the cover member deflects inward toward the webbing guide 30 causing the second rib portion 110 and the first and second rib extensions 120 and 130 to close the second gap 116 to the webbing guide and to contact the webbing guide. Once contact begins, the second rib portion 110 and the rib extensions 120 and 130 crush to absorb the force of the impact. If the impact is of a relatively large magnitude, the first gap 104 between the first rib portion 100 and the bolt head 76 is also closed and the first rib portion also resiliently crushes to absorb the force of the impact. Because the second gap 116 is smaller than the first gap 104, the second rib portion 110 and the rib extensions 120, 130 of the cover member 80 absorb the bulk of the force of the impact.

Should the cover member 80 be struck from a direction other than along the axis A (i.e., at an angle), the annular configuration of the first and second rib portions 100 and 110 serves to distribute the force of the impact over the rest of the cover member and thereby reduces variation in energy absorption capability which could occur due to an angled impact on the cover member. Additionally, the first and second rib extensions 120 and 130 provide load stability to the second rib portion 110 by further distributing the force of an angled impact.

The resistance to compression provided by the resilient cover member 80 in the assembly 10 protects the occupant's head from the full force of the impact by reducing the peak acceleration seen by the occupant's head 19. Further, the location of the first rib portion 100 adjacent the bolt head 76 prevents any direct contact between the occupant's head 19 and the mounting bolt 70.

In accordance with the primary object of the invention, the resilient cover member 80 provides the assembly with an HIC(d) of under 1000 determined in accordance with the United States Department of Transportation Federal Motor Vehicle Safety Standard No. 201.

When the occupant's head 19 moves out of contact with the cover member 80, and the resiliency of the cover member 80 and the rib portions 100, 110 returns the cover member to its original position shown in FIG. 3.

From the above description of the invention, those skilled in the art will perceive improvements, changes, and modifications of the invention. Such improvements, changes and modifications within the skill in the art are intended to be covered by the appended claims.

Having described the invention, we claim:

1. An assembly for use in a vehicle, said assembly comprising:

a webbing guide for guiding movement of seat belt webbing in the vehicle;

a fastener for mounting said webbing guide in position in the vehicle, said fastener including a head portion and a longitudinal axis; and a resilient cover including a cover portion covering said head portion of said fastener and at least a portion of said webbing guide, said resilient cover further including a first rib portion projecting from said cover portion toward said head portion of said fastener and a second rib portion projecting from said cover portion toward said webbing guide, said first and second rib portions being resiliently crushable to absorb energy in response to an impact of a vehicle occupant's head against said cover portion, and said resilient cover further including first and second rib extensions which extend from said second rib portion, said first and second rib extensions being spaced apart from each other about the longitudinal axis of said fastener, said first and second rib extensions extending from said second rib portion and being disposed in a plane containing the longitudinal axis of said fastener.

2. The assembly of claim 1 wherein said first and second rib portions are annular and are disposed concentrically.

3. The assembly of claim 1 wherein said first and second rib extensions extend from said second rib portion at diametrically opposed locations, said first rib extension extending toward a first side portion of said cover, said second rib extension extending toward a second side portion of said cover.

4. The assembly of claim 3 wherein, prior to being crushed, said first rib portion is spaced from said head portion of said fastener by a first distance to define a first gap and said second rib portion is spaced from said webbing guide by a second distance to define a second gap, said second distance being less than said first distance.

5. The assembly of claim 4 wherein said first and second rib extensions which extend from said second rib portion are spaced from said webbing guide by said second distance.

6. The assembly of claim 5 wherein, upon impact of a vehicle occupant's head against said cover portion, said second gap closes before said first gap closes so that said second rib portion absorbs a larger portion of the energy of the impact than said first rib portion.

7. The assembly of claim 6 wherein said first and second rib portions are approximately one millimeter thick.

8. The assembly of claim 1 wherein said resilient cover is made of a homogeneous plastic material.

9. An assembly for use in a vehicle, said assembly comprising:

a webbing guide for guiding movement of seat belt webbing in the vehicle;

a fastener for mounting said webbing guide in position in the vehicle, said fastener including a head portion; and a resilient cover including a cover portion covering said head portion of said fastener and at least a portion of said webbing guide, said resilient cover further including a wall portion extending from the perimeter of said cover portion toward said webbing guide, a first rib portion spaced apart from said wall portion and projecting from said cover portion toward said head portion of said fastener, and a second rib portion spaced apart from said wall portion and said first rib portion and projecting from said cover portion toward said webbing guide, said first rib portion having a circular, hollow shell configuration, said second rib portion having a circular, hollow shell configuration, and said first and second rib portions being disposed concentrically, said first and second rib portions being resiliently crushable to absorb energy in response to an impact of a vehicle occupant's head against said cover portion.

10. The assembly of claim 9 wherein said resilient cover further includes first and second rib extensions which extend from said second rib portion, said rib extensions extending radially from said second rib portion at diametrically opposed locations, said first rib extension extending toward a first side portion of said cover, said second rib extension extending toward a second side portion of said cover.

11. The assembly of claim 9 wherein said resilient cover provides said assembly with an HIC(d) of under 1000 determined in accordance with the United States Department of Transportation Federal Motor Vehicle Safety Standard No. 201 (1996).

12. An assembly for use in a vehicle, said assembly comprising:

a webbing guide for guiding movement of seat belt webbing in the vehicle;

a fastener for mounting said webbing guide in position in the vehicle, said fastener including a head portion; and a resilient cover including a cover portion covering said head portion of said fastener and at least a portion of said webbing guide, said resilient cover further including a first rib portion projecting from said cover portion toward said head portion of said fastener and a second rib portion projecting from said cover portion toward said webbing guide, said first and second rib portions being resiliently crushable to absorb energy in response to an impact of a vehicle occupant's head against said cover portion, and said resilient cover further including first and second rib extensions which extend from said second rib portion, said rib extensions extending at diametrically opposed locations, said first rib extension extending toward a first side portion of said cover, said second rib extension extending toward a second side portion of said cover.

13. The assembly of claim 12 wherein, prior to being crushed, said first rib portion is spaced from said head portion of said fastener by a first distance to define a first gap and said second rib portion is spaced from said webbing guide by a second distance to define a second gap, said second distance being less than said first distance.

14. The assembly of claim 13 wherein said first and second rib extensions which extend from said second rib portion are spaced from said webbing guide by said second distance.

15. The assembly of claim 14 wherein, upon impact of a vehicle occupant's head against said cover portion, said second gap closes before said first gap closes so that said second rib portion absorbs a larger portion of the energy of the impact than said first rib portion.

16. The assembly of claim 12 wherein said first and second rib portions are approximately one millimeter thick.

17. The assembly of claim 12 wherein said resilient cover is made of a homogeneous plastic material.

18. An assembly for use in a vehicle, said assembly comprising:

a webbing guide for guiding movement of seat belt webbing in the vehicle;

a fastener for mounting said webbing guide in position in the vehicle, said fastener including a head portion; and a resilient cover including a cover portion covering said head portion of said fastener and at least a portion of said webbing guide, said resilient cover further including a wall portion extending from the perimeter of said cover portion toward said webbing guide, a first rib portion spaced apart from said wall portion and projecting from said cover portion toward an end surface of said head portion of said fastener, and a second rib portion spaced apart from said wall portion and spaced apart from said first rib portion, said second rib portion projecting from said cover portion toward said webbing guide, said first rib portion having a circular, hollow shell configuration, said second rib portion having a continuously curved, hollow shell configuration defining an interior chamber, said first rib portion being located within said interior chamber, said first and second rib portions being resiliently crushable to absorb energy in response to an impact of a vehicle occupant's head against said cover portion.

* * * * *